(12) United States Patent
Mani

(10) Patent No.: US 10,528,647 B2
(45) Date of Patent: Jan. 7, 2020

(54) OPTIMIZATION FOR BROWSER RENDERING DURING NAVIGATION

(71) Applicant: eBay Inc., San Jose, CA (US)

(72) Inventor: Sembian Mani, San Jose, CA (US)

(73) Assignee: eBay Inc., San Jose, CA (US)

( * ) Notice: Subject to any disclaimer, the term of this patent is extended or adjusted under 35 U.S.C. 154(b) by 240 days.

(21) Appl. No.: 15/617,829

(22) Filed: Jun. 8, 2017

(65) Prior Publication Data

US 2017/0357383 A1    Dec. 14, 2017

Related U.S. Application Data

(60) Provisional application No. 62/348,319, filed on Jun. 10, 2016.

(51) Int. Cl.
*G06F 17/21* (2006.01)
*G06F 17/22* (2006.01)

(52) U.S. Cl.
CPC ........ *G06F 17/212* (2013.01); *G06F 17/2247* (2013.01)

(58) Field of Classification Search
CPC .. G06F 16/957; G06F 16/9574; G06F 17/211; G06F 17/227; G06F 3/0483
See application file for complete search history.

(56) References Cited

U.S. PATENT DOCUMENTS

| | | | | |
|---|---|---|---|---|
| 2013/0275853 | A1* | 10/2013 | Eidson | G06F 16/9574 715/234 |
| 2015/0279310 | A1* | 10/2015 | Itakura | G09G 5/005 345/520 |
| 2015/0379014 | A1* | 12/2015 | Xu | G06F 17/211 707/711 |

* cited by examiner

*Primary Examiner* — Justin S Lee
(74) *Attorney, Agent, or Firm* — SBMC

(57) ABSTRACT

In various example embodiments, heavy document object model (DOM) elements in a heavy web page are removed directly from a DOM tree subsequent to a request being received to navigate to another web page but before the web browser actually navigates to that other web page. In one example embodiment, the heavy DOM elements are deleted from the previous page during an 'onbeforeunload' event using a scripting language such as Javascript, to ensure that the render of the next page starts faster.

20 Claims, 12 Drawing Sheets

OPTIMIZATION FOR BROWSER RENDERING DURING NAVIGATION

PRIORITY

This application is a Non-Provisional of and claims the benefit of priority from U.S. Provisional Application Ser. No. 62/348,319, entitled "RENDERING OPTIMIZATIONS," filed on Jun. 10, 2016 which is hereby incorporated by reference herein in its entirety.

TECHNICAL FIELD

Embodiments of the present disclosure relate generally to web browsers operating on computing devices. More particularly, embodiments of the present disclosure relate to optimizations of rendering of web browsers.

BACKGROUND

Web browsers operating on computing devices are software applications for retrieving, presenting, and traversing information resources on the World Wide Web. These information resources are typically in the form of a web page, image, video, or other piece of content that is readable by the web browser. Users are able to navigate to and within web pages to obtain or view information.

Web browsers take content from the World Wide Web and render that content so that it is visible on a display of the corresponding computing device on which the web browser is being run. Certain types of web pages, however, may introduce inefficiencies in the rendering process that cause themselves, or subsequently loaded web pages, to render slowly. Specifically, heavy web pages are subject to these types of inefficiencies. Heavy web pages are web pages that include calls to content that is either slow to retrieve or slow to render, such as web pages with iFrames or calls to videos. What is needed are optimizations to handle the inefficiencies introduced by heavy web pages on the rendering process of web browsers.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, heavy document object model (DOM) elements in a heavy web page are removed directly from a DOM tree subsequent to a request being received to navigate to another web page but before the web browser actually navigates to that other web page. In one example embodiment, the heavy DOM elements are deleted from the previous page during an 'onbeforeunload' event using a scripting language such as Javascript, to ensure that the render of the next page starts faster.

Figure 1:
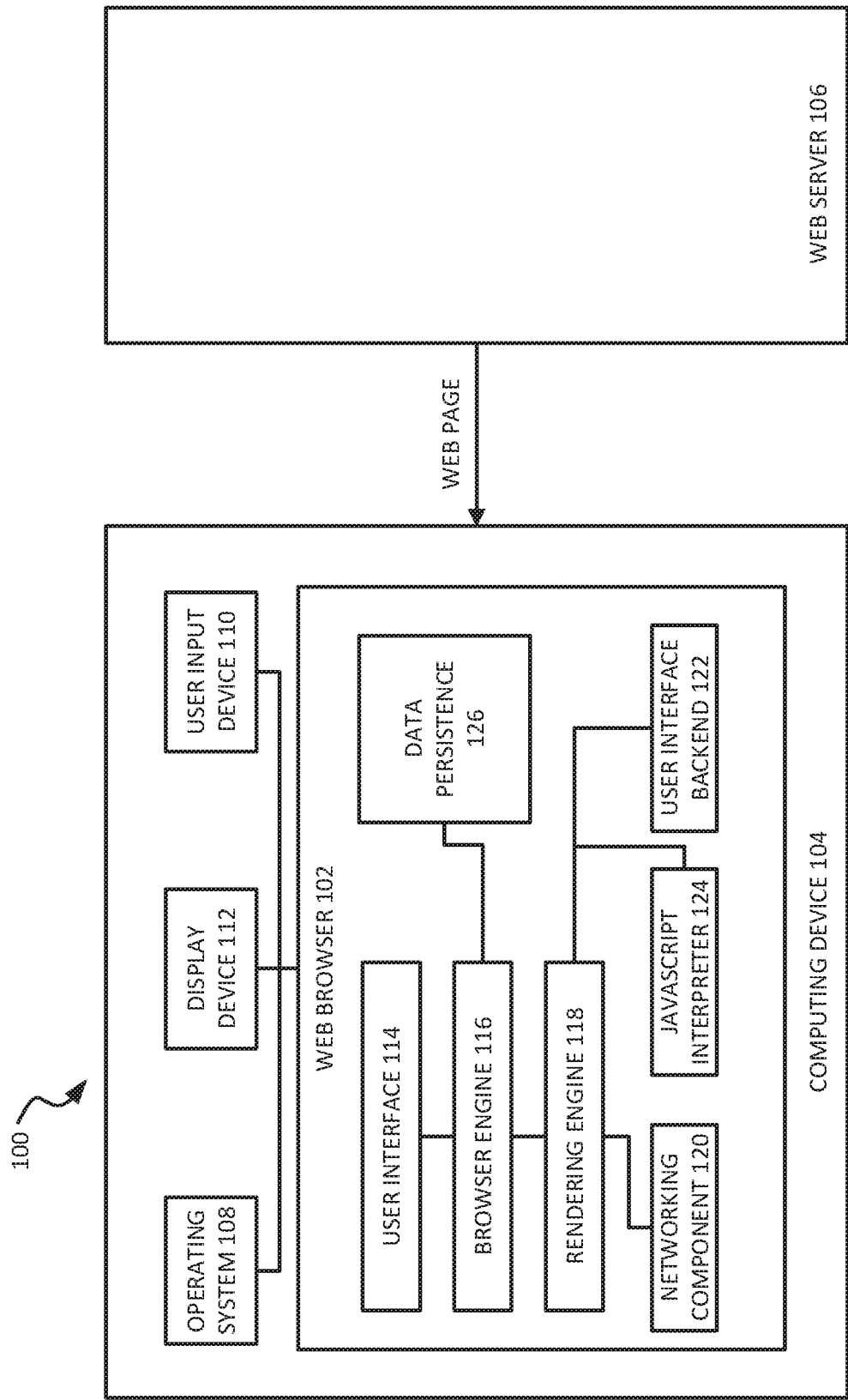
FIG. 1 is a block diagram illustrating system including a web browser in accordance with an example embodiment.

FIG. 1 is a block diagram illustrating a system 110 including a web browser 112 in accordance with an example embodiment. The system 110 represents one example system that can be used to implement the processes described herein. Specifically, in some example embodiments embodiment, the one or more optimization techniques are implemented as a JavaScript or similar scripting language element, executed in a web browser 112 on a computing device 114. For ease of discussion, many of the aspects of the optimization techniques will be discussed in terms of this JavaScript or similar scripting language implementation. Nevertheless, these aspects could also be implemented on the other example systems and nothing in this disclosure should be interpreted as limiting these aspects to the JavaScript or similar scripting language implementation.

The computing device 114 may be, for example, a desktop computer, laptop computer, tablet computer, smart phone, smart watch or any other computing device capable of displaying a graphical user interface via a scripting language and web browser combination. It should be noted, however, that in fact the further systems described later need not be limited to those computing devices capable of displaying a graphical user interface via a scripting language and web browser combination and can, in fact, extend to any computing devices capable of displaying a graphical user interface.

The system 110 includes computing device 114 as well as a web server 116. Web server 116 delivers a web page to the computing device 114 upon request. This request may either be explicit by the user of the computing device 114, such as navigating the web browser 112 to a specific web address, or may be implicit or automatic. The web page may, for example, be in the form of Hypertext Markup Language (HTML) code or other markup language code, which may incorporate various calls and/or scripts through languages such as Cascade Style Sheets (CSS) and JavaScript.

An operating system 118 on the computing device 114 controls interactions between the web browser 112 and a user input device 120. In other words, the operating system 120 can detect when a user interacts with the web browser 112 via input to the user input device 120 and transmits such interactions to the web browser 112. Examples of user input devices 120 include mice, keyboards, touchpads, touchscreens, microphones, and any other device capable of receiving user input. The web browser 112 can output rendered GUI elements on a display device 122 of the computing device 114. In some example embodiments, the display device 122 and the user input device 120 are the same device, such as in the case of a touchscreen.

The web browser 112 contains its own user interface 124 (which may display, for example, an address bar, back/forward button, bookmarking menu, etc.). A browser engine 126 marshals actions between the user interface 124 and a rendering engine 128. The rendering engine 128 is responsible for rendering content (e.g., web pages). The rendering engine 128 may contain one or more specialized parsers (e.g., HTML parser, CSS parser) for this purpose.

A networking component 120 handles calls such as Hypertext Transfer Protocol (HTTP) to and from the web server 116, using different implementations based on the platform, typically behind a platform-independent interface. A user interface backend 122 handles drawing basic web page components such as buttons and windows. A JavaScript interpreter 124 is used to parse and execute JavaScript code found in a web page parsed by the rendering engine 128. Finally, a data persistence layer 126 allows the web browser 112 to save various types of data locally, such as cookies.

In an example embodiment, specialized JavaScript code is provided to the JavaScript interpreter 124, either via a downloaded web page or by directly modifying one or more JavaScript libraries utilized by the JavaScript interpreter 124, which causes one or more optimizations to occur on heavy elements in a web page at particular times.

Figure 2:
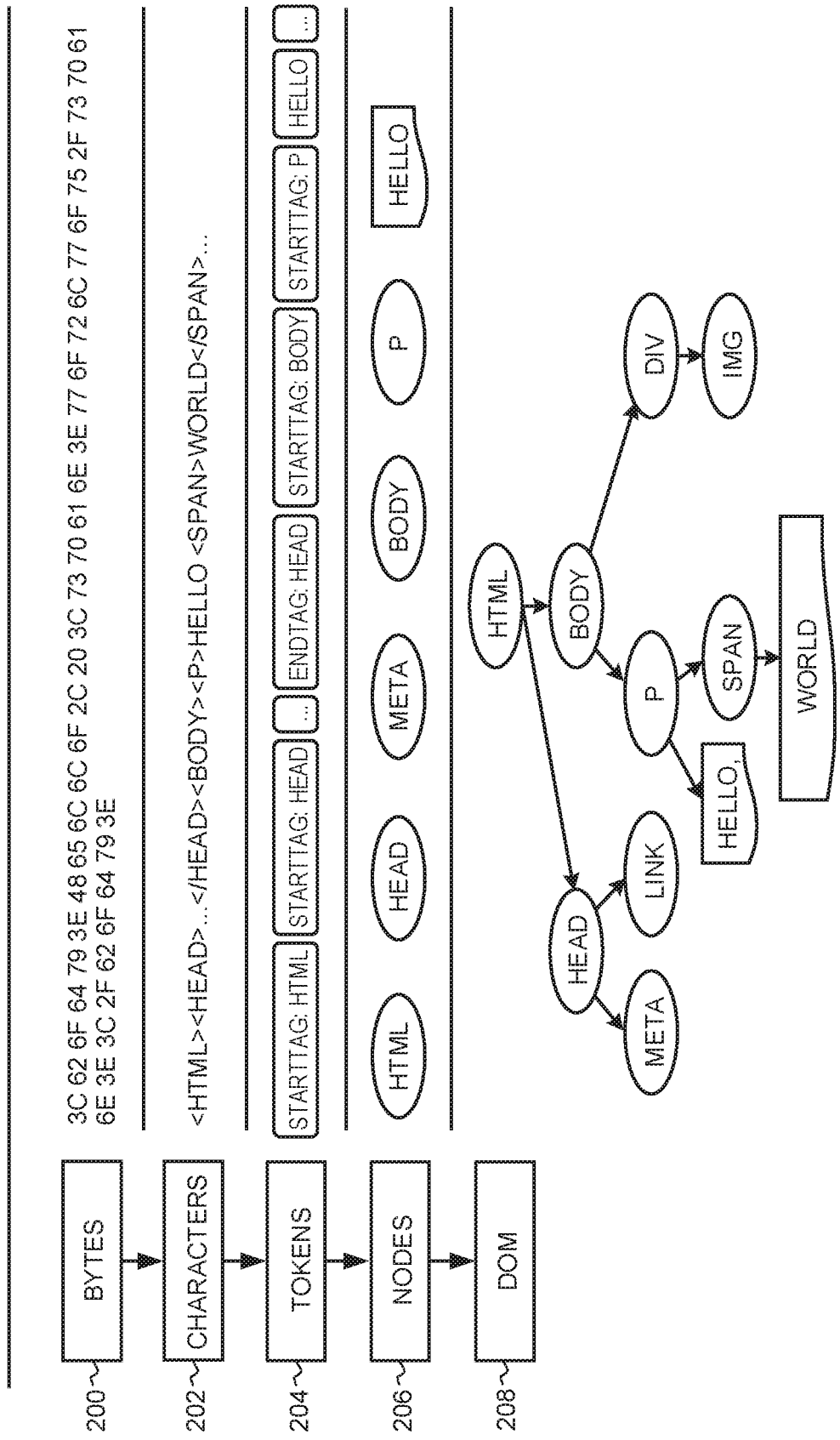
FIG. 2 is a diagram illustrating the building of an example DOM by a web browser.

Web browsers render a web page by first building a DOM, also known as a DOM tree, from the Hypertext Markup Language (HEW) or other code defining the web page. The DOM/DOM tree is a data structure in which elements of the web page are organized as nodes in a tree, with connections between the nodes indicating an ordering for future rendering. FIG. 2 is a diagram illustrating the building of an example DOM by a web browser. Here, the bytes 200 of incoming packets are parsed by a web parser to determine the characters 202 of the web page. The characters 202 are then parsed by an HTML parser to a series of tokens 204, each token representing a different element of the web page. A DOM parser then forms the tokens into nodes 206 and connects the nodes to form a DOM 208.

Figure 3:
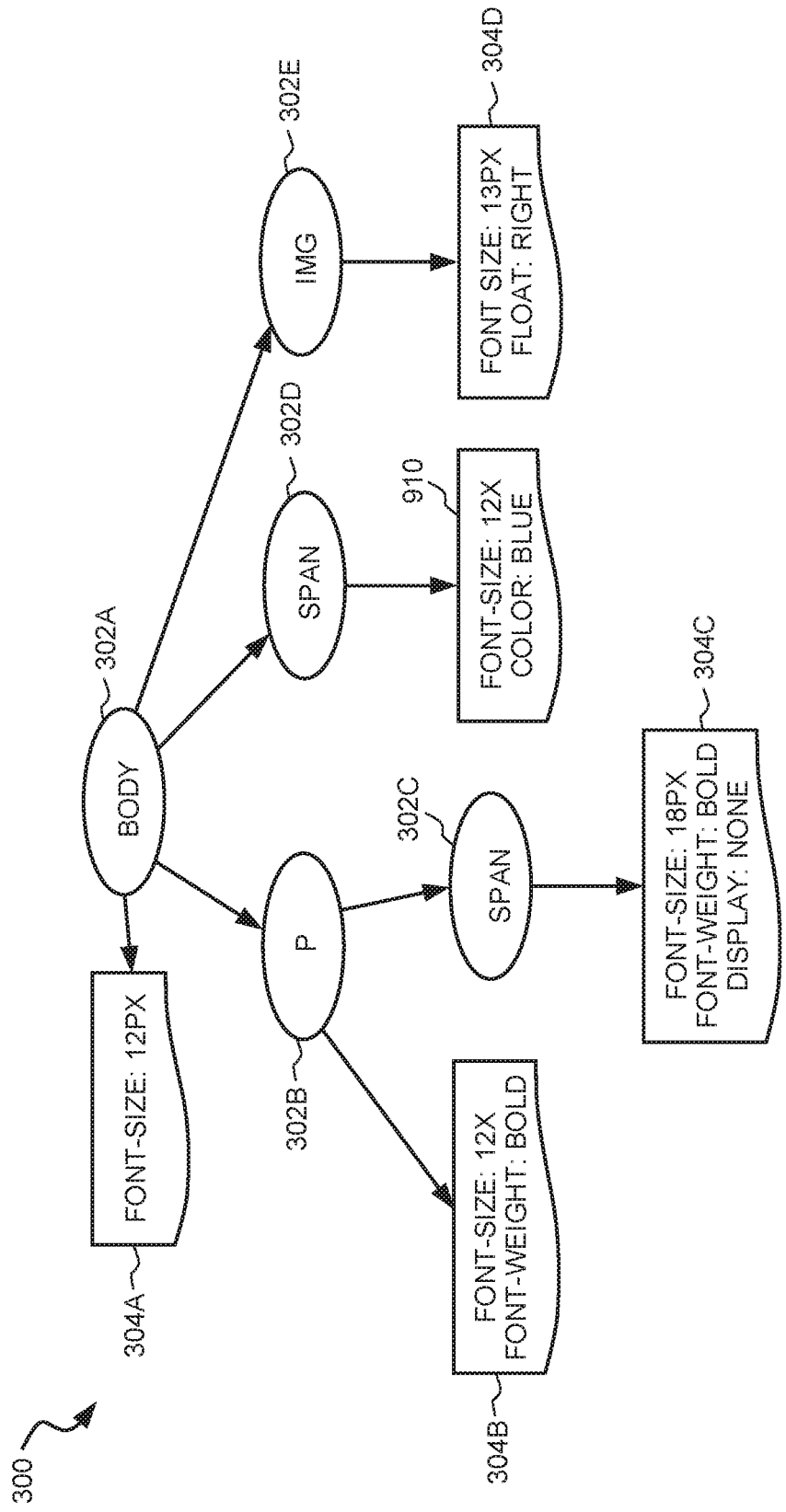
FIG. 3 is a diagram illustrating an example CSSOM.

If Cascade Style Sheets (CSS) are used with the web page, then one or more CSS documents related to the web page are parsed into a CSS Object Model (CSSOM). FIG. 3 is a diagram illustrating an example CSSOM 300. The CSSOM 300 includes one or more CSS elements 302A-302E, along with leaf nodes 304A-304E representing values for specific styles.

Figure 4:
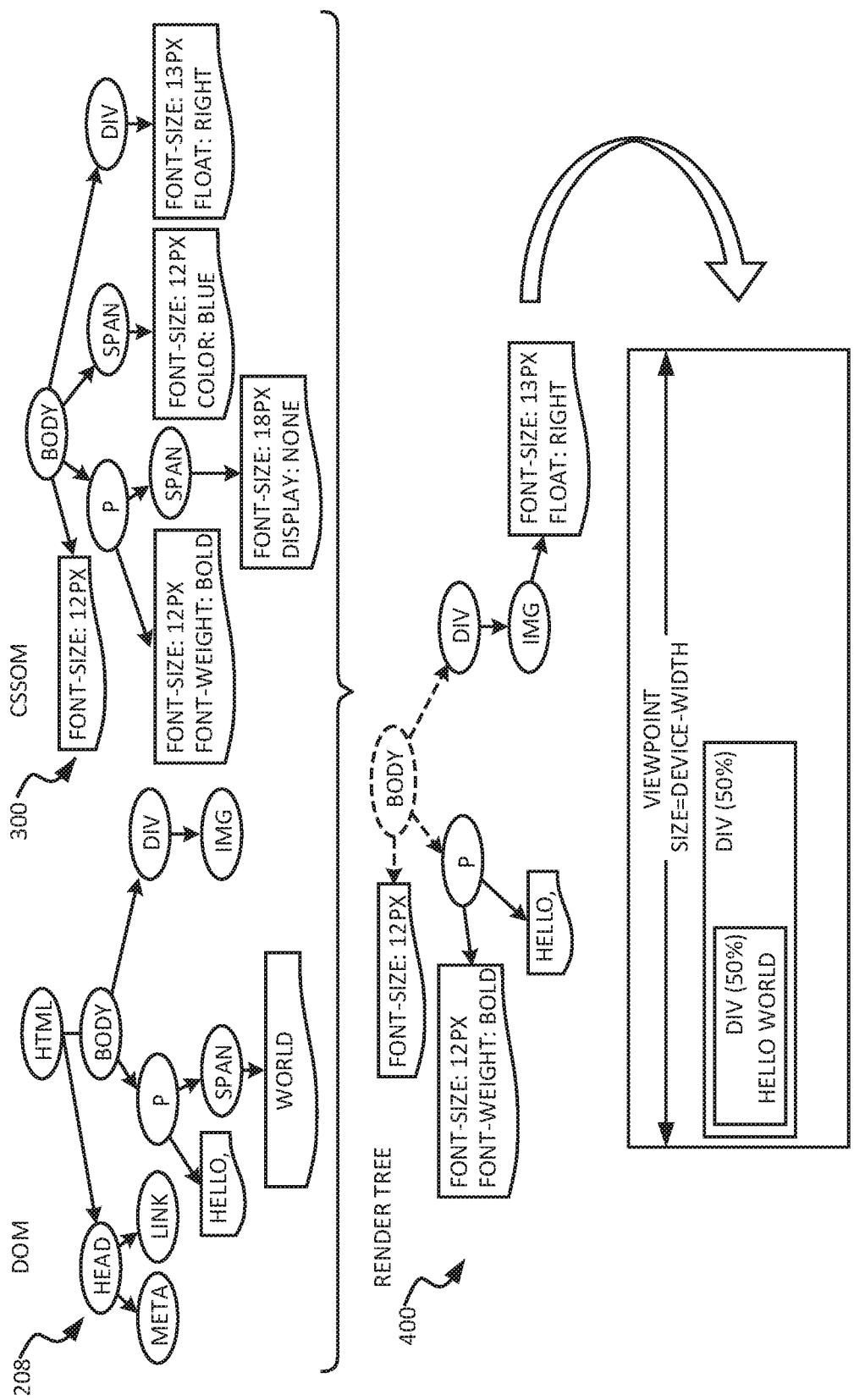
FIG. 4 is a diagram illustrating the creation of a render tree.

Then a render tree is created from the DOM and the CSSOM. FIG. 4 is a diagram illustrating the creation of a render tree 400. The render tree is created through a merging of the DOM 208 and the CSSOM 300. From the render tree 300, the visual objects of the web page are laid out and printed on a display 402.

Figure 5:
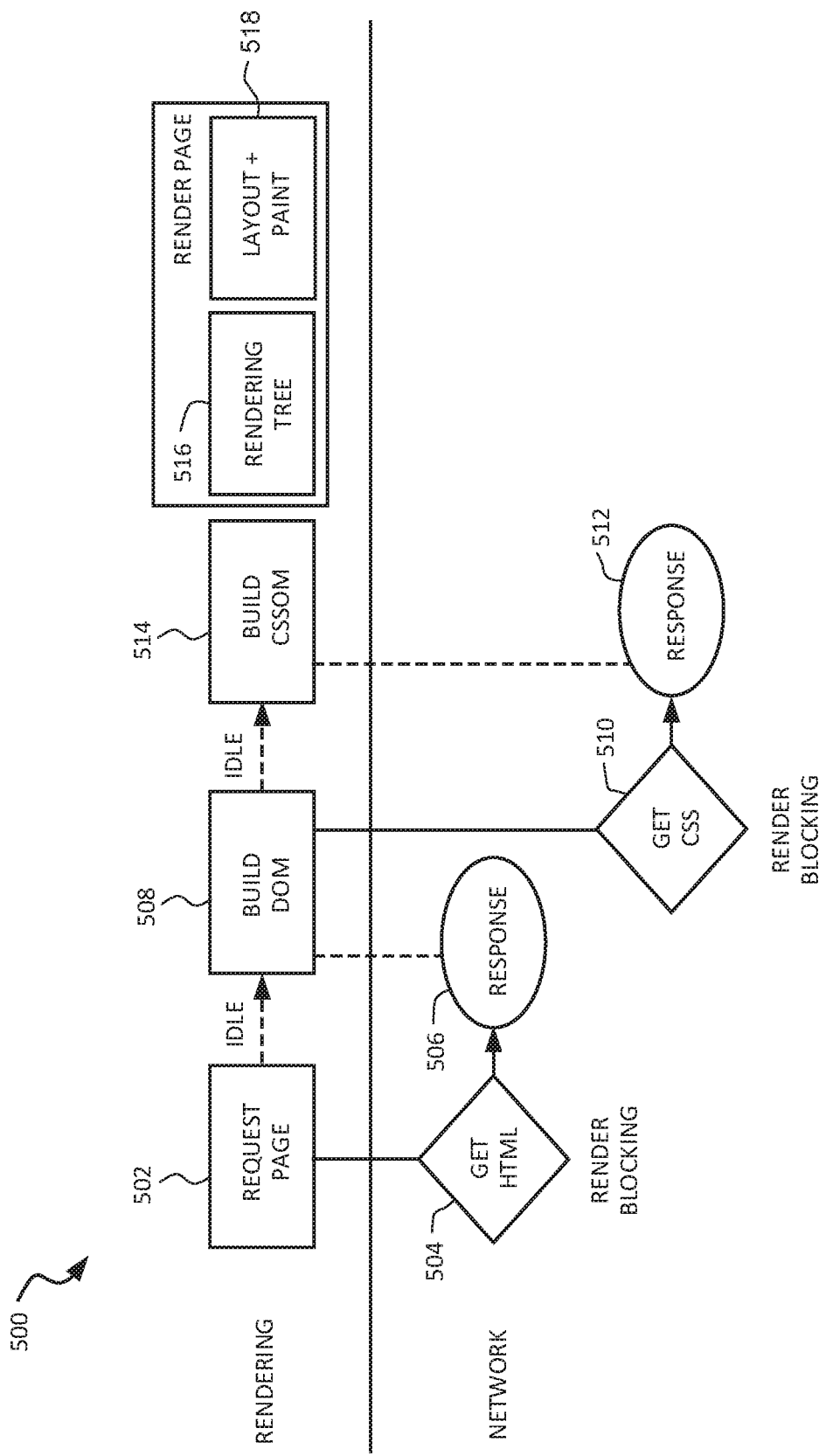
FIG. 5 is a flow diagram illustrating a method of rendering of a web page.

FIG. 5 is a flow diagram illustrating a method 500 of rendering of a web page. The method 500 is divided into steps performed on the rendering engine 128 and steps performed elsewhere in the network. Here, the rendering engine 128 requests a web page at operation 502. At operation 504, a web page is obtained, and sent as a response in operation 506 to the rendering engine 128. At operation 508, the rendering engine 128 builds the DOM from the web page. Through this building process, it is determined that CSS files are referenced. At operation 510 these CSS documents are obtained and sent in a response to the rendering engine 128 at operation 512. At operation 514 the CSSOM is built. At operation 516, the rendering tree is built and at operation 518 the visual elements are laid out and painted on a display.

Figure 6:
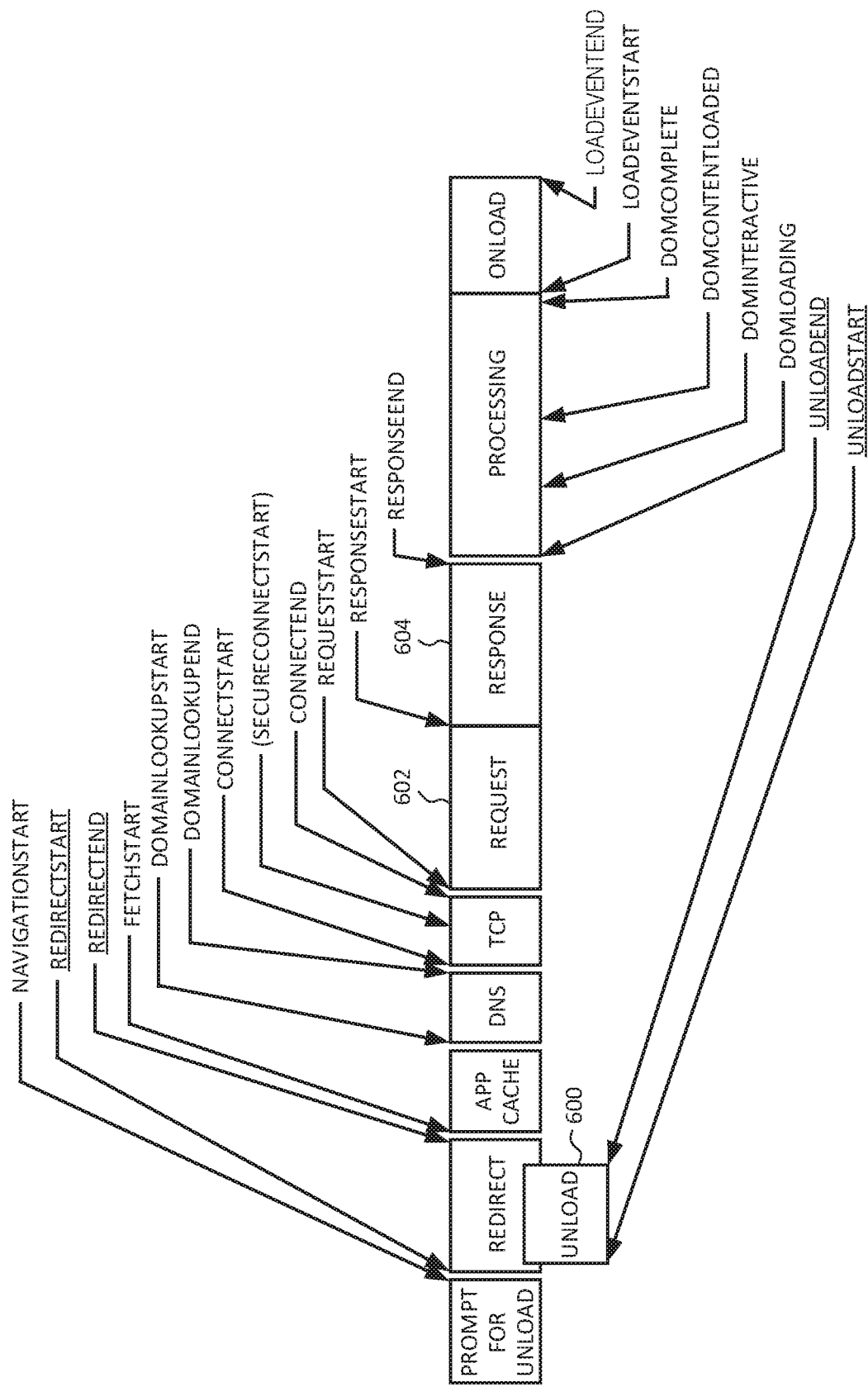
FIG. 6 is a navigation graph showing loading of a web page in a web browser in accordance with W3C standards.

FIG. 6 is a navigation graph showing loading of a web page in a web browser in accordance with W3C standards. As can be seen, the unloading 600 of a previously rendered web page is supposed to occur in parallel to the main request 602 and response 604 for the new web page. As such, the unloading 600 of the previously rendered web page should not affect the rendering of the subsequently loaded web page. It was, however, discovered by the present inventor that there is, in practice, a delay introduced in this process when heavy pages are rendered.

Figure 7:
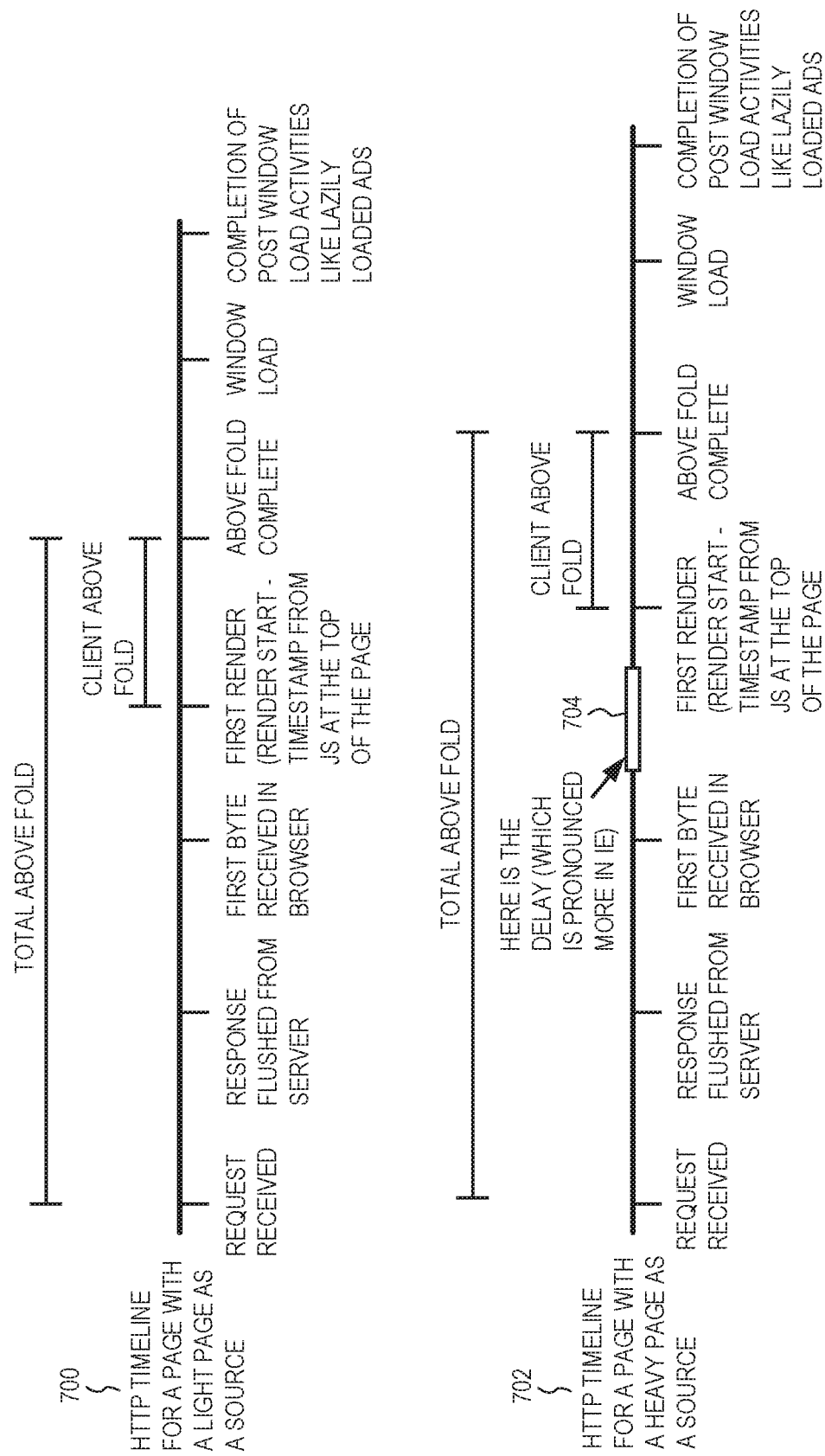
FIG. 7 is a diagram depicting two timelines.

Specifically, FIG. 7 is a diagram depicting two timelines 700, 702. The first timeline 700 depicts events occurring when rendering a web page subsequent to a light (i.e., non-heavy) web page, whereas the second timeline 702 depicts events occurring when rendering a web page subsequent to a heavy web page.

Notably, a delay 704 occurs in the second timeline between when the first byte of the new web page is received in the web browser and when the first rendering of the new web page begins.

Figure 8:
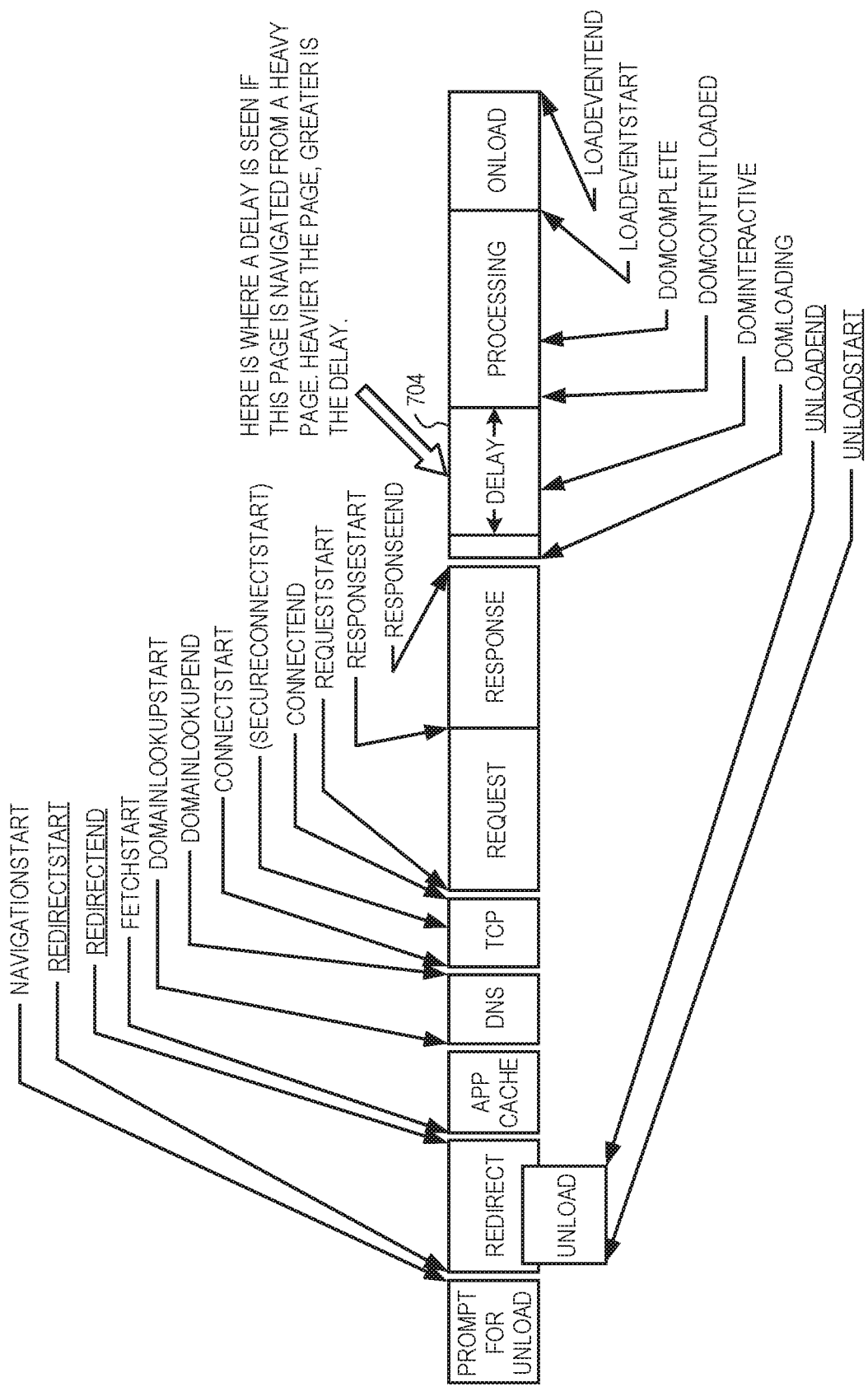
FIG. 8 is a navigation graph showing loading of a web page in a web browser where a delay occurs.

This delay 704 is also depicted in the navigation graph of FIG. 8.

The ideal way to address this delay 704 is to design only light web pages, but this is practically difficult when product or other demand necessitate that the web page contains heavy components, such as video links and iframes. Iframes are HTML elements that call other web content, such as advertisements, to render within a web page.

For example, a search results page may be presented in a web browser in response to a web search. When new advertisements are introduced onto a search results page, even though these advertisements are lazily loaded after a window load event, the time to first render of these pages is quite bad. This degradation in performance may even continue for all pages that had the search results page as a source page.

Furthermore, while the time to first render has degraded, the time to first byte does not degrade. Thus, after the web browser receives the response and before starting to render the page, this degradation can be observed. The time between first byte and first render can be calculated by subtracting the first byte time from the timestamp at the start of the markup. If this time can be called "browser think time", then it is this browser think time that is surprisingly high when navigating from a heavy web page. Specifically, it is the time between the domLoading and domInteractive event where this degradation can be observed. domLoading is triggered when the web browser is about to start parsing the first received bytes of the HTML, code, while domInteractive is triggered when the web browser has finished parsing enough HTML code and constructed the DOM neede to start rendering the web page.

In an example embodiment, a solution is provided where heavy DOM elements are removed from a DOM tree before navigation to a new web page (i.e., when an onbeforeunload event is triggered). This may be performed, for example, by introducing a JavaScript code into the web page as follows:
window.addEventhistener('beforeunload', function( ){

```
//Collect the heavy DOM elements
var heavyElements =
Array.prototype.slice.call(document.getElementsByTagName('iframe'));
//Remove them from the DOM
for (var i = 0, 1 = heavyElements.length; i < 1; i++) {
heavyElements[i].parentNode.removeChild(heavyElements[i]);
}
});
```

The above script only addresses iframe elements but could be modified for any heavy elements that can be contained in a web page.

Figure 9:
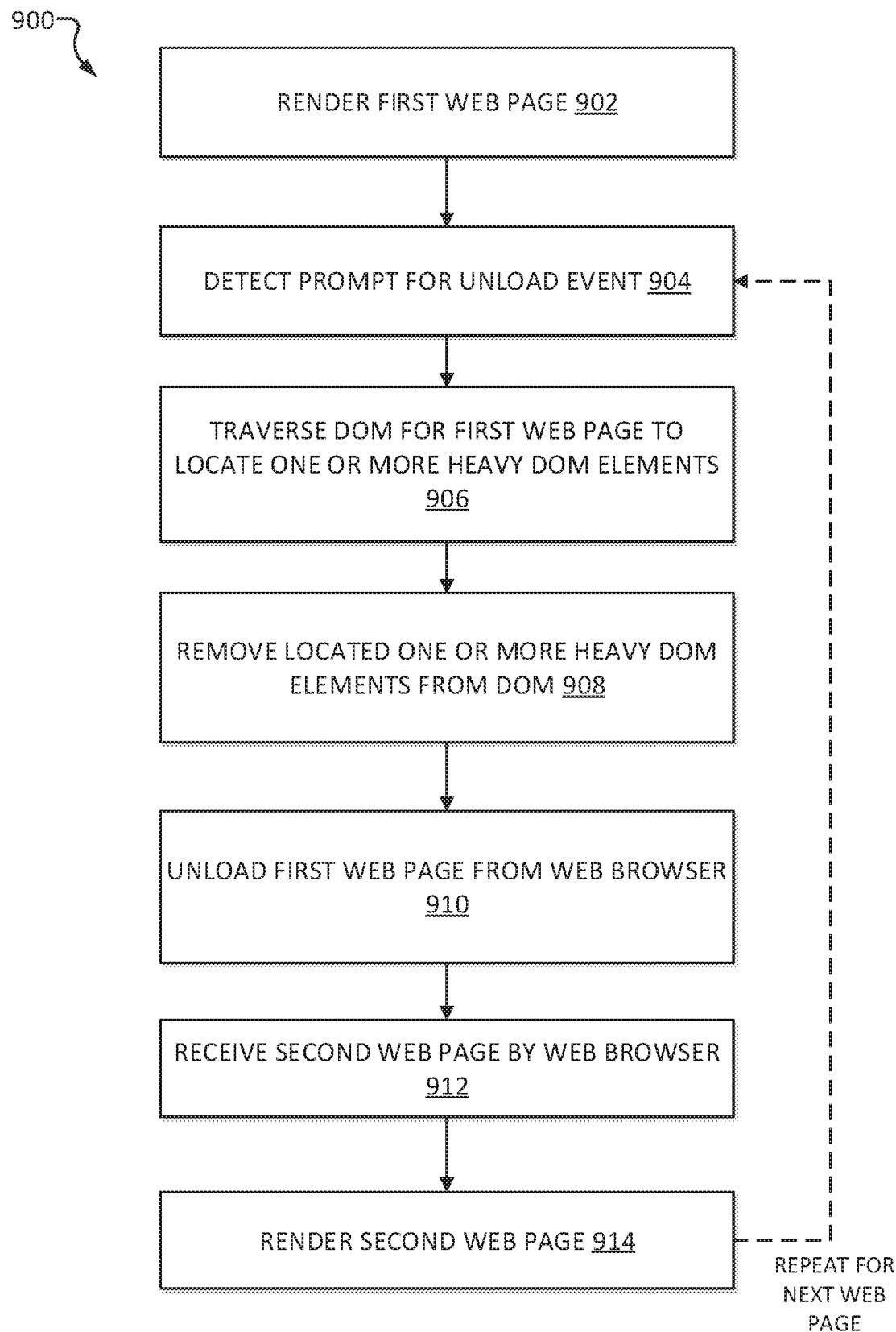
FIG. 9 is a flow diagram illustrating a method for optimizing rendering of a web page in accordance with an example embodiment.

FIG. 9 is a flow diagram illustrating a method 900 for optimizing rendering of a web page in accordance with an example embodiment. At operation 902, a first web page is rendered. The steps and substeps involved in rendering the first web page will not be described here as the rendering of the first web page can actually be performed in any manner, as long as at some point a DOM is created for the first web page. In some example embodiments, the rendering of the first web page may have been performed in the same manner as will be described below with respect to the second web page, but in other example embodiments the first web page may simply be rendered in an ordinary fashion.

At operation 904, a prompt for unload event is detected. This prompt for unload event is typically an event thrown when a user attempts to navigate from one web page to another web page in a web browser, either by the user explicitly selecting a link to the another web page or by virtue of a web page or script automatically transferring the web browser to another web page. Nevertheless, in response to this detection, the remained of the method 900 is performed. Specifically, at operation 906 a DOM for the first web page is traversed to locate one or more heavy DOM elements in the DOM. At operation 908, the located one or more heavy DOM elements are removed from the DOM. Notably, operations 904-906 may be performed, in some example embodiments, using a JavaScript or other script associated with the first web page. At operation 910, the first web page is unloaded from the web browser. At operation 912, the second web page is received by the web browser. At operation 914, the second web page is rendered by the web browser. In some example embodiments, the method 900 may be repeated by at this point looping back to operation 904, except this time performing operations 906-810 for the second web page instead of the first, and in fact this method 900 may continue to loop indefinitely for additional web pages.

Figure 10:
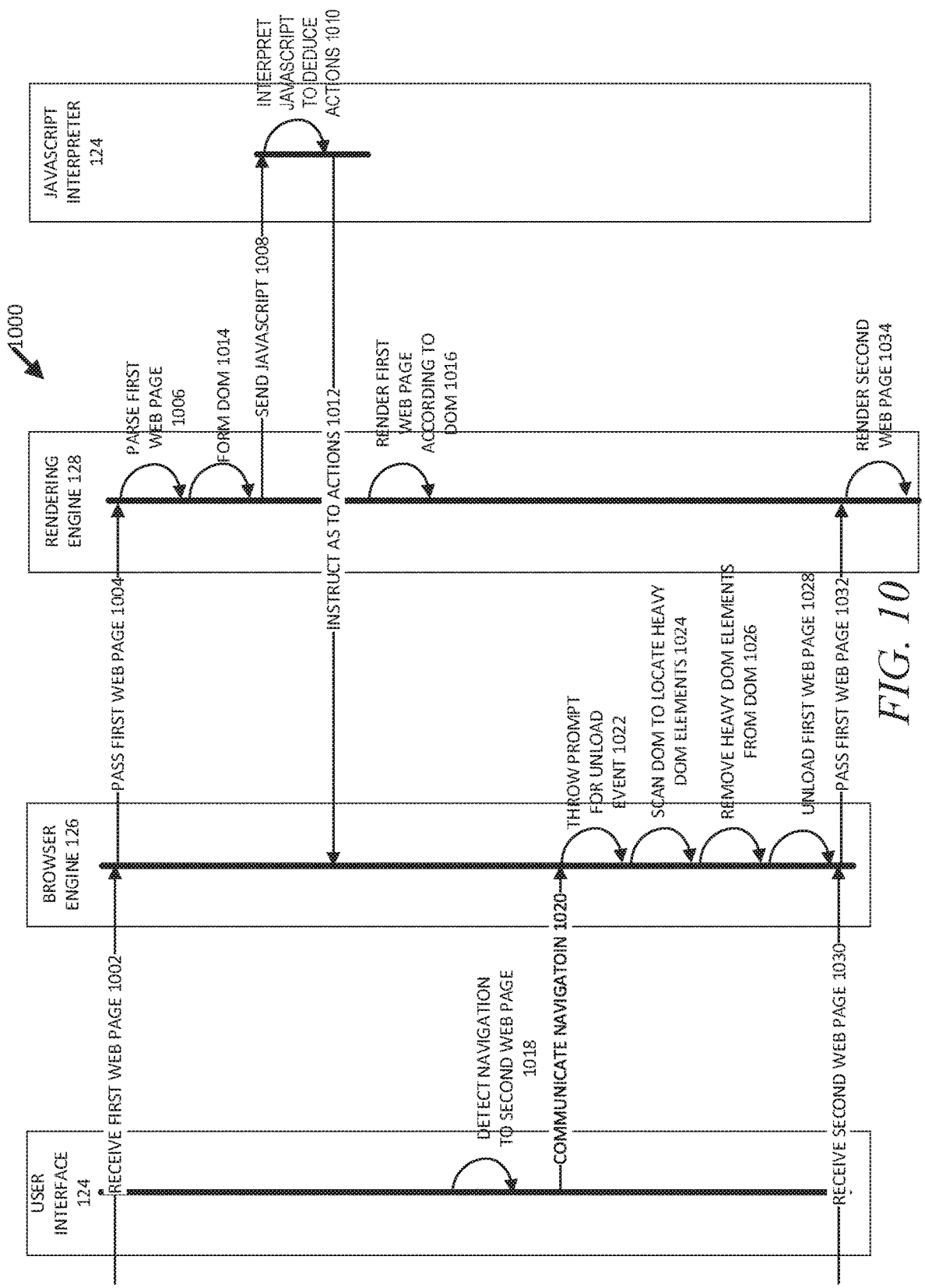
FIG. 10 is an interaction diagram illustrating a method of optimizing a web page in accordance with an example embodiment.

FIG. 10 is an interaction diagram illustrating a method 1000 of optimizing a web page in accordance with an example embodiment. The method 1000 involves various components of a web browser, including user interface 124, browser engine 126, rendering engine 128, and JavaScript interpreter 124. At operation 1002, a first web page is received by the browser engine 126. At operation 1004, the browser engine 126 passes the first web page to a rendering engine 128, which at operation 1006 acts to parse the web page. Discovery of JavaScript associated with the first web page during this parsing, the rendering engine 128 then sends this JavaScript to the JavaScript interpreter 124 to interpret the JavaScript at operation 108. The JavaScript interpreter then interprets this JavaScript, which includes a script indicating actions to take in response to a prompt for unload event at operation 1010, and at operation 1012 it instructs the browser engine as to these actions.

Also during the parsing, at operation 1014, the rendering engine 128 forms a DOM from the first web page. At operation 1016, the rendering engine 128 renders the first web page in accordance with the DOM.

At operation 1018, the user interface 124 detects an action by the user that causes navigation from the first web page to a second web page to occur. This action may be, for example, the user selecting on a link to the second web page, typing a uniform resource locator (URL) in a navigation bar of the web browser, or any other action that causes the navigation to occur. At operation 1020, the user interface 124 communicates this navigation to the browser engine 126. At operation 1022, the browser engine 126 throws a prompt for unload event, causing the actions from the JavaScript interpreter to be performed. These actions include, at operation 1024, scanning the DOM of the first web page to locate any heavy DOM elements, and at operation 1026, removing the heavy DOM elements from the DOM. At operation 1028, the browser engine 126 unloads the first web page.

At operation 1030, the second web page is received by the browser engine 126. At operation 1032, the second web page is sent to the rendering engine 128, where at operation 1034 it is rendered.

In some example embodiments, applications other than a web browser itself may utilize one or more aspects of the above-described ideas. For example, a mobile application ("app") operating on a mobile device might also parse DOM elements from web pages, despite not necessarily being termed a "web browser." Additionally, in some example embodiments similar techniques can be applied outside of the DOM realm, with removal of heavy elements from other types of data structures used in rendering, either with a web browser embodiment or in a non-web browser environment.

It should be noted that removal of DOM elements via Javascript or similar techniques may actually be more efficient than leaving the web browser to perform the unload process. However, in some browser embodiments it may turn out to be costlier and in such cases it may be preferable to forego such techniques and simply rely on the browser to perform the unloading without deletion of the heavy DOM elements from the DOM. In some example embodiments, this determination may be dynamically performed by analyzing one or more variables including, but not limited to, the browser type, the hardware device on which the browser is operating (e.g, processing power, memory speed and availability), current load on the hardware device on which the browser is operating, etc.

In other example embodiments, DOM elements may be classified under more categories than just "heavy" and "light". Specifically, intermediate levels of heaviness may be specified and applied to certain types of DOM elements that are not quite as heavy as iframe elements or video links. The above-described dynamic determination of whether to remove such elements may then factor in the level of heaviness in its determination. In some example embodiments, rather than a category assigned to elements denoting the heaviness a heaviness score may be assigned, which may make calculations performed by the dynamic determination steps easier.

The use of the above techniques can be detected using, for example, a browser extension that scans for heavy DOM elements in a web page before and after an unload event (e.g., 'onbeforeunload') is thrown. If the heavy elements in the DOM are missing subsequent to this unload event, it indicates usage of one or more of the above ideas.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-9 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 11:
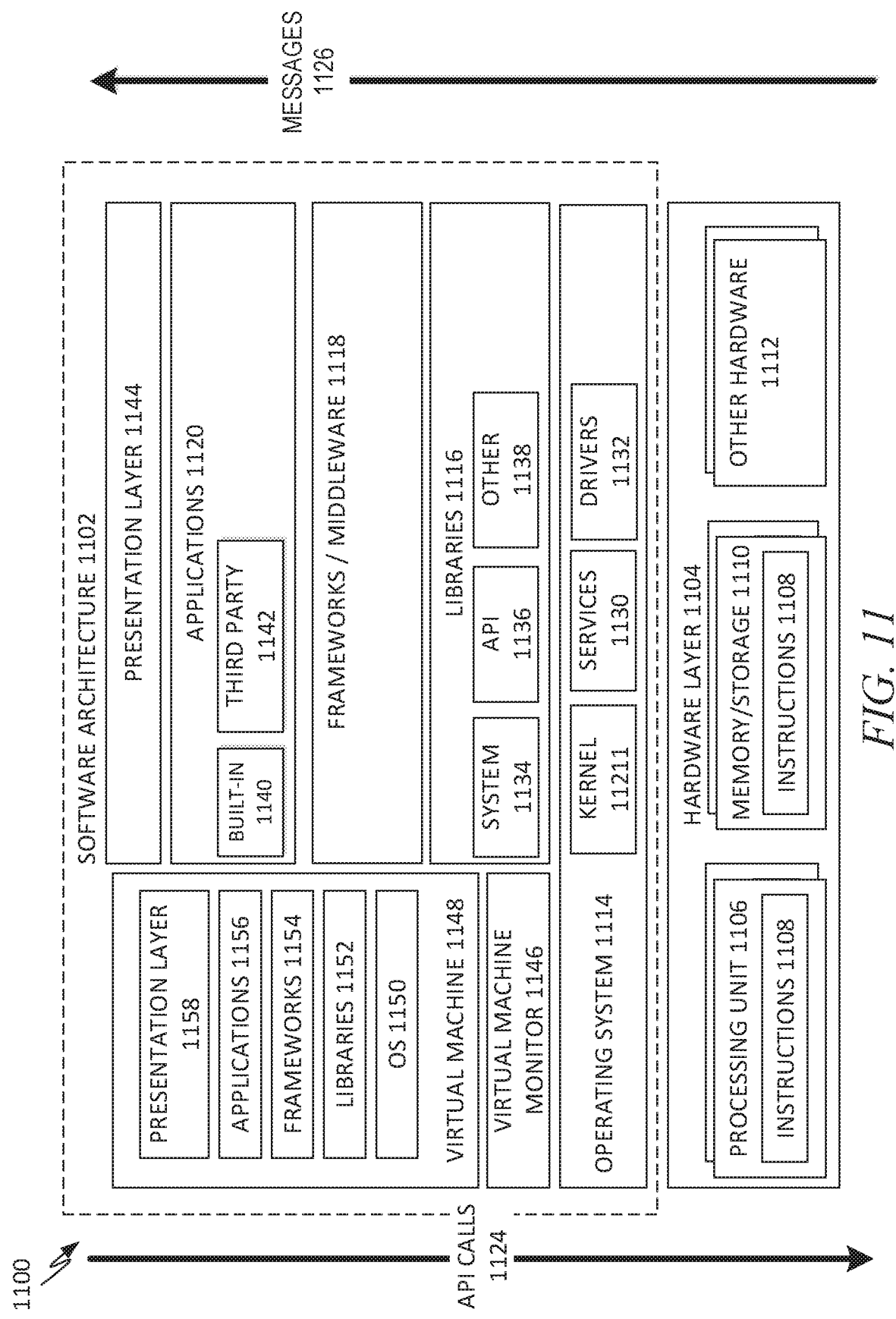
FIG. 11 is a block diagram illustrating an example of a software architecture that may be installed on a machine, according to some example embodiments.

FIG. 11 is a block diagram 1100 illustrating a representative software architecture 1102, which may be used in conjunction with various hardware architectures herein described. FIG. 11 is merely a non-limiting example of a software architecture and it will be appreciated that many other architectures may be implemented to facilitate the functionality described herein. The software architecture 1102 may be executing on hardware such as machine 1200 of FIG. 12 that includes, among other things, processors 1210, memory 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. Executable instructions 1108 represent the executable instructions of the software architecture 1102, including implementation of the methods, modules and so forth of FIGS. 1-9. Hardware layer 1104 also includes memory or storage modules 1110, which also have executable instructions 1108. Hardware layer 1104 may also comprise other hardware as indicated by 1112 which represents any other hardware of the hardware layer 1104, such as the other hardware illustrated as part of machine 1200.

In the example architecture of FIG. 11, the software 1102 may be conceptualized as a stack of layers where each layer provides particular functionality. For example, the software 1102 may include layers such as an operating system 1114, libraries 1116, frameworks/middleware 1118, applications 1120 and presentation layer 1122. Operationally, the applications 1120 or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130, or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third party applications 1142. Examples of representative built-in applications 1140 may include, but are not limited to, a contacts application, a browser application, a book reader application, a location application, a media application, a messaging application, and/or a game application. Third party applications 1142 may include any of the built in applications as well as a broad assortment of other applications. In a specific example, the third party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware machine (such as the machine of FIG. 12, for example). A virtual machine is hosted by a host operating system (operating system 1114 in FIG. 12) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 can be the same as corresponding layers previously described or may be different.

Example Machine Architecture and Machine-Readable Medium

Figure 12:
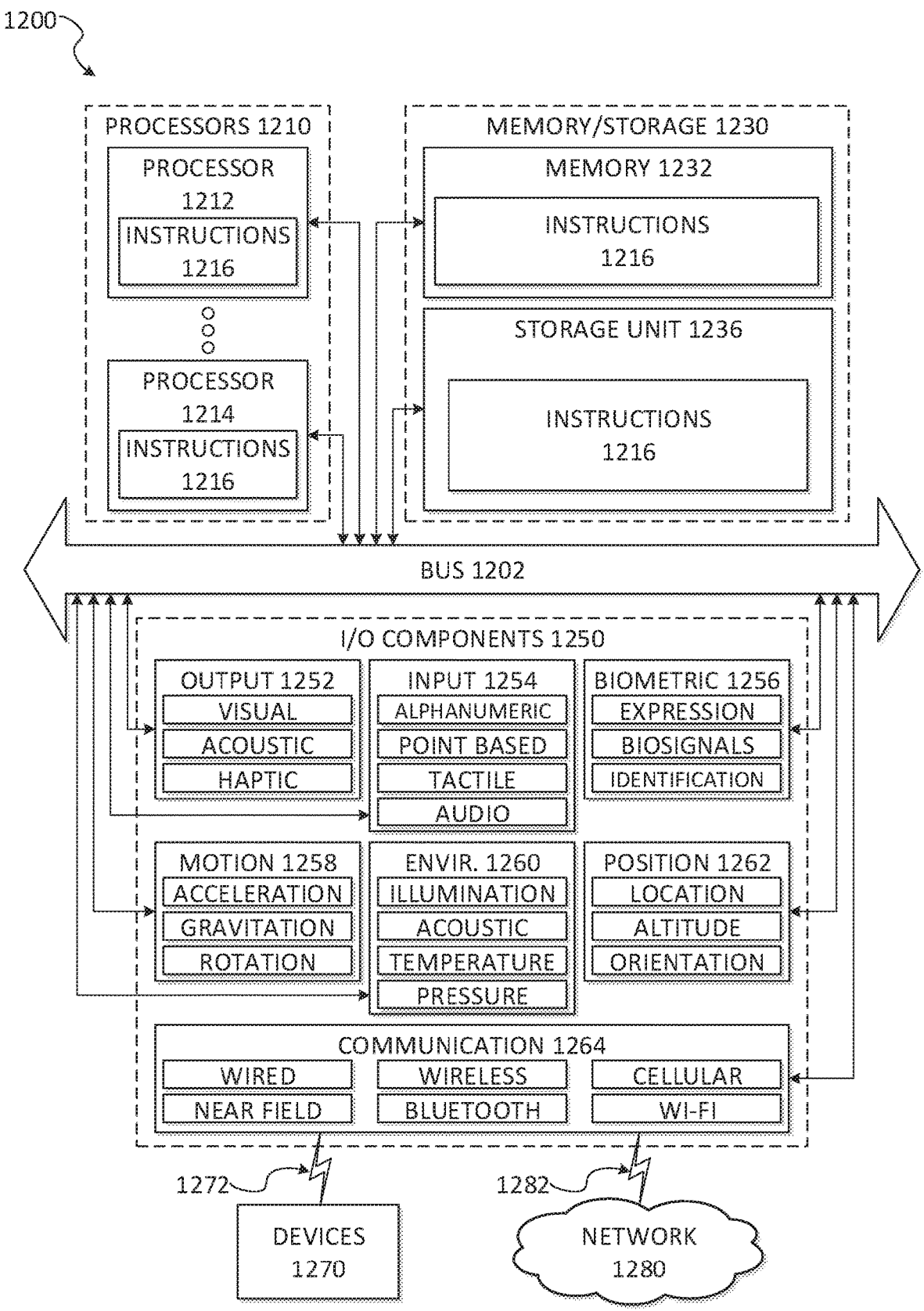
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an apples, an app, or other executable code) for causing the machine 1200 to perform any one or more of the methodologies discussed herein may be executed. For example the instructions may cause the machine to execute the flow diagram of FIG. 7. Additionally, or alternatively, the instructions may implement FIGS. 1-6, and so forth. The instructions transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CNC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1212 and processor 1214 that may execute instructions 1216. The term "processor" is intended to include multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272 respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is provisionally claimed is:

1. A system comprising:
   at least one hardware processor;
   a computer-readable medium storing instructions, which when executed by the processors, perform operations comprising:
     rendering a first web page, the rendering comprising forming a document object model (DOM) from elements in the first web page;
     detecting a prompt for an unload event;
     in response to the detecting, scanning the DOM to locate one or more heavy DOM elements in the DOM;
     removing the one or more heavy DOM elements from the DOM;
     responsive to removing the one or more heavy DOM elements from the DOM, unloading the first web page; and
     rendering a second web page.

2. The system of claim 1, wherein the rendering the first web page and the rendering a second web page are performed by a rendering engine within a web browser.

3. The system of claim 1, wherein the detecting, scanning, removing, and unloading are performed by a browser engine within a web browser.

4. The system of claim 1, wherein the removing the one or more heavy DOM elements is performed by a script written in a scripting language.

5. The system of claim 1, wherein the one or more heavy DOM elements include an iframe element.

6. The system of claim 1, wherein the one or more heavy DOM elements include a video link.

7. The system of claim 1, wherein the unload event is thrown when a user navigates from the first web page to the second web page in a web browser.

8. A method comprising:
   rendering a first web page, the rendering comprising forming a document object model (DOM) from elements in the first web page;
   detecting a prompt for an unload event;
   in response to the detecting, scanning the DOM to locate one or more heavy DOM elements in the DOM;
   removing the one or more heavy DOM elements from the DOM;
   responsive to removing the one or more heavy DOM elements from the DOM, unloading the first web page; and
   rendering a second web page.

9. The method of claim 8, wherein the rendering the first web page and the rendering a second web page are performed by a rendering engine within a web browser.

10. The method of claim 8, wherein the detecting, scanning, removing, and unloading are performed by a browser engine within a web browser.

11. The method of claim 8, wherein the removing the one or more heavy DOM elements is performed by a script written in a scripting language.

12. The method of claim 8, wherein the one or more heavy DOM elements include an iframe element.

13. The method of claim 8, wherein the one or more heavy DOM elements include a video link.

14. The method of claim 8, wherein the unload event is thrown when a user navigates from the first web page to the second web page in a web browser.

15. A non-transitory machine-readable storage medium having instruction data to cause a machine to perform operations comprising:
   rendering a first web page, the rendering comprising forming a document object model (DOM) from elements in the first web page;
   detecting a prompt for an unload event;
   in response to the detecting, scanning the DOM to locate one or more heavy DOM elements in the DOM;
   removing the one or more heavy DOM elements from the DOM;
   responsive to removing the one or more heavy DOM elements from the DOM, unloading the first web page; and
   rendering a second web page.

16. The non-transitory machine-readable storage medium of claim 15, wherein the rendering the first web page and the rendering a second web page are performed by a rendering engine within a web browser.

17. The non-transitory machine-readable storage medium of claim 15, wherein the detecting, scanning, removing, and unloading are performed by a browser engine within a web browser.

18. The non-transitory machine-readable storage medium of claim 15, wherein the removing the one or more heavy DOM elements is performed by a script written in a scripting language.

19. The non-transitory machine-readable storage medium of claim 15, wherein the one or more heavy DOM elements include an iframe element.

20. The non-transitory machine-readable storage medium of claim 15, wherein the one or more heavy DOM elements include a video link.

* * * * *